United States Patent [19]

Tschanun

[11] Patent Number: 4,810,222
[45] Date of Patent: Mar. 7, 1989

[54] LASER CATHODE PRODUCTION PROCESS

[75] Inventor: Wolfgang Tschanun, Freiburg, Fed. Rep. of Germany

[73] Assignee: LITEF GmbH, Freiburg im Breisgau, Fed. Rep. of Germany

[21] Appl. No.: 119,180

[22] Filed: Nov. 10, 1987

[30] Foreign Application Priority Data

Nov. 10, 1986 [EP] European Pat. Off. ...... 86 115 578.6

[51] Int. Cl.$^4$ .............................................. H01S 3/03
[52] U.S. Cl. ........................................ 445/28; 445/58; 372/88
[58] Field of Search ................. 445/5, 28, 58; 372/87, 372/88, 94

[56] References Cited

U.S. PATENT DOCUMENTS

| | | | |
|---|---|---|---|
| 3,740,110 | 6/1973 | Horton et al. | 445/28 |
| 3,904,986 | 9/1975 | Hernqvist | 372/88 |
| 4,007,431 | 2/1976 | Abbink et al. | 372/94 |
| 4,017,808 | 4/1977 | Fein et al. | 372/88 X |
| 4,273,282 | 6/1981 | Norvell et al. | 228/116 |
| 4,392,229 | 7/1983 | Hostetler | 372/94 |
| 4,612,647 | 9/1986 | Norvell | 372/88 |
| 4,682,963 | 7/1987 | Daldry et al. | 445/5 |

FOREIGN PATENT DOCUMENTS

| | | |
|---|---|---|
| 2627611 | 12/1977 | Fed. Rep. of Germany . |
| 2091481 | 1/1981 | United Kingdom . |
| 2132407 | 12/1983 | United Kingdom . |

OTHER PUBLICATIONS

D. Chance et al "Cathodes for He-Ne Lasers" *IBM Journal Research Development;* vol. 23; No. 2; pp. 119-127 (Mar. 1979).

Sputtering of Oxide Films in Plasma Anoduzation of Aluminum, by L. D. Locker & L. P. Skoh *Applied Physics Letters,* vol. 12, No. 11 pp. 396-397 (6/68).

*Primary Examiner*—Kenneth J. Ramsey
*Attorney, Agent, or Firm*—Elliott N. Kramsky

[57] ABSTRACT

A process for producing a laser cathode by vacuum coating provides well-controlled, slow layer growth in the presence of the laser gas at a total pressure of up to $5 \times 10^{-4}$ mbar. Such process includes laser gas atoms in the cathode layer. Without interruption of the vacuum, the coated cathode is moved into a (second) position and laser gas is introduced under slight pressure against the cathode coating by means of a nozzle. At the same time, a number of discharge cycles are initiated via the electrically conductive base of the cathode basic element and an electrode, arranged concentrically with respect to the nozzle, having the effect of premature sputtering-off to cause a levelling of the current density and a further inclusion of inert gas atoms in the Al coating. After a number of discharge cycles, a small amount of oxygen may be added to form an $Al_2O_3$ passivation layer before flooding of the recipient. The process substantially increases the operating reliability and long-term stability of laser amplifiers and oscillators.

8 Claims, 1 Drawing Sheet

LASER CATHODE PRODUCTION PROCESS

BACKGROUND

1. Field of the Invention

This invention relates to a laser cathode production process. More particularly, this invention pertains to a process for producing a laser cathode of the type that includes a substantially spherical glass or glass-ceramic base of predetermined thermal properties with an aluminum or aluminum alloy interior coating.

2. Description of the Prior Art

Laser cathodes of the type that include a basic element of glass or glass-ceramic of domed shape and semispherical dome curvature are described in West German patent application No. DE-A1-33 46 232. Such cathodes are most commonly employed in laser amplifiers and oscillators. In operation, a negative potential is applied to the laser cathode and it is bombarded by the positively charged ions (e.g. He+ and Ne+) that combine with the electrons supplied to the (oxidized) inner surface of the cathode as a result of the negative potential. As a result, uncharged gas molecules are again formed. The impacts of the ions with the cathode's surface produces surface sputtering processes and absorption of light inert gases (e.g., He and Ne). Such processes reduce the service life of the cathode and, of course, that of the entire laser arrangement as such sputtering effects continually contaminate the laser gases.

In prior coating processes, the cathode became naturally oxidized in an unreproducible way when the coating unit was opened after coating. Attempts were made to enhance cathode service life by post-oxidation of the applied Al layer (e.g., by introduction of pure oxygen and an oxygen/inert gas mixture). Such efforts have realized only limited success. The mirrors of the laser arrangement are adversely affected by such oxygen charging processes.

SUMMARY AND OBJECTS OF THE INVENTION

It is, therefore, an object of the present invention to provide a laser cathode production process that substantially increases the operating service life of laser arrangements equipped therewith.

It is a further object of the invention to attain the preceding object without requiring subsequent oxygen treatment and thereby avoid accompanying undesirable secondary effects.

The foregoing objects are accomplished by the invention that provides a process for producing a laser cathode of the type that includes a substantially semispherical basic element of glass or glass-ceramic material with a vacuum-deposited aluminum or aluminum-alloy interior coating. The process is begun by placing the cleaned basic element into the recipient of a vacuum unit and into an electrically conductive base that has an opening aligned with the interior of the cathode basic element.

The pressure in the recipient is reduced so that the oxygen partial pressure is less than $2 \times 10^{-9}$ mbar and the residual gas pressure does not exceed $2 \times 10^{-7}$ mbar. The recipient is charged with at least one laser gas under slight pressure at the same time the aluminum or aluminum alloy coating is applied in a coating process that is controllable with regard to the layer growth rate, such coating covering a portion of the base to provide an electrically conductive base. The coated basic element is then brought into position over a gas inlet device in the recipient without interrupting the vacuum so that a laser gas mixture is admitted to the recipient up to a total pressure of a few mbar. Thereafter an electrical discharge is repeatedly struck to the coating contacted to the outside via the conductive base with an initiating electrode projecting into such recipient.

The preceding and other features of this invention will become further apparent from the detailed description that follows. This description is accompanied by a set of drawing figures. Numerals of the drawing figures correspond to those of the written description, like numerals referring to like features throughout.

DETAILED DESCRIPTION

Figure 2:
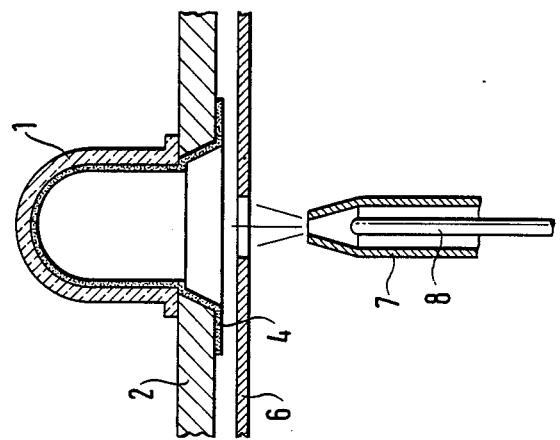
FIG. 2 is a like representation of the procedure for testing the striking behavior by smoothing and slowly oxidizing the cathode surface.
Figure 1:
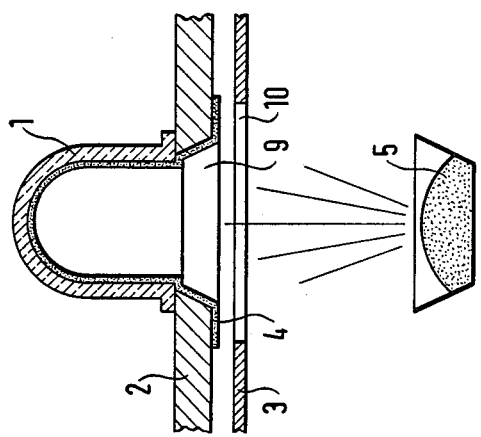
FIG. 1 is a sectional diagrammatic representation of the vacuum aluminization with simultaneous insertion of laser gas molecules portion of the process of the invention.

Turning now to the drawings, FIG. 1 is a sectional diagrammatic representation of the coating process of the invention. A substantially semispherical basic element 1 of glass or glass-ceramic material having thermal properties that are particularly suitable for laser amplifier or oscillator operation with an internal diameter of, for example, 12.5 mm, is first cleaned by an appropriate process (e.g. ultrasonic, ozone or manual cleaning) and placed onto a mount or base 2 in the recipient of a vacuum unit (not shown). A through-opening 9 of the base 2 is aligned with the interior of the basic element 1. A mask cover 3 is provided on the underside with an opening 10, the diameter of which is greater than that of the through-opening 9.

As indicated diagrammatically by 5, the inside of the basic element 1 is coated from below by electron beam vaporization or like known method, such as sputtering or thermal vaporization of Al or suitable Al alloy material. The arrangement of the basic element 1, the base 2 and the cover 3 and the sizes and alignments of the openings 9 and 10 are selected so that, apart from the inner surface of the basic element 1, a partial area of the base 2 is also Al-coated. Continuous electrical connection is thereby established between the Al coating 4 of the laser cathode and that of the base 2. The base 2 necessarily consists of an electrically conductive material. The significance of such continuous electrical connection will become apparent below.

According to the process of the invention, the pressure within the recipient is first reduced so that the oxygen partial pressure becomes, for example, less than $2 \times 10^{-9}$ mbar and the residual gas pressure does not exceed $2 \times 10^{-7}$ mbar. Thereafter, the recipient is flooded with at least one laser gas or gas mixture (e.g. He/Ne) under slight pressure to increase the total pressure to, for example, $5 \times 10^{-4}$ mbar. Then the Al or Al-alloy coating is applied at a low growth rate. During the slow layer growth atoms of a subsequent operating gas (e.g. inert gases such as argon, helium or neon) may be incorporated into the coating which cannot later diffuse into the layer as such layer is already saturated.

The coating process used must be precisely controllable providing a coating deposition rate of below 1 nm/sec. Such slow growth ensures that a relatively high inert gas fraction is incorporated into the Al layer. The high gas background pressure achieves a high degree of layer uniformity over the inner surface of the basic element 1, and thus of the cathode, as well as a good edge coverage regardless of the coating method chosen. Total layer thickness should be about 150 nm (thinnest point). Measurements of the deposition rate and layer thickness may be performed in the region of the cathode by a measuring device that includes oscillating crystals. In the case of thermal vaporization, layer thickness may be simply determined from the mass of the material vaporized.

After coating the base 2, the coated cathode 1, 4, and a cover 6 having a reduced aperture are brought into position over a nozzle 7 without interruption of the vacuum. Evacuation is carried out during repositioning to return to the residual gas pressure before coating to obtain an oxygen partial pressure which is as low as possible. Subsequently, a laser gas mixture is admitted into the recipient through the nozzle 7 until overall pressure of a few mbar is reached in the cathode and its surroundings. The nozzle 7 is formed of an electrically non-conductive material. An electrode 8 coated, for example, with precious metal is contained in concentric arrangement within the nozzle 7.

An electrical discharge is struck by direct- or alternating-current voltage from outside through the current path electrode 8, the inert gas mixture, the Al coating, the base 2 and the electrical lead-throughs on the vacuum unit (not shown). Such electrical charge further charges the cathode layer 4, the surface of which is not yet oxidized, with atoms of the inert gas and impresses the current necessary for subsequent operation.

After repeated evacuation and striking cycles, sputtering-off of the Al atoms occurs at points of high current density that accompany the electrical discharge to smooth the surface until the operating current density becomes homogeneous. After a number of striking cycles, a small amount of oxygen may be added to the inert gas to occasion slow oxidation of the Al surface to $Al_2O_3$. This operation is carried out carefully so that the impressed current is retained and the atoms of the inert gases included in the conductive layer remain to the maximum extent possible. The $Al_2O_3$ layer formed on the surface provides a diffusion barrier and is distinguished by a substantially smaller sputtering-off rate than Al or an Al alloy.

After attaining an adequate degree of oxygen passivation, it is desirable to perform additional striking cycles under conditions expected to occur during subsequent cathode use to ensure reliable striking. That concludes the production process. Cathode storage outside the vacuum unit should occur only in an inert gas atmosphere.

Thus it is seen that the present invention provides a laser cathode production process that substantially increases the operating service life of a laser arrangement equipped therewith. The process does not require the subsequent oxygen treatments of the prior art that are known to produce undesirable secondary effects.

While this invention has been described with reference to a presently-preferred embodiment, it is not so limited in scope. Rather, the scope of this invention is limited only insofar as defined by the following set of claims and includes all equivalents thereof.

What is claimed is:

1. A process for producing a laser cathode of the type that includes a substantially semispherical basic element of glass or glass-ceramic material with a vacuum deposited aluminum or aluminum-alloy interior coating, said process comprising the steps of:
    a. placing the cleaned basic element into the recipient of a vacuum unit and onto an electrically conductive base having an opening aligned with the interior of said cathode basic element; then
    b. reducing the pressure in said recipient so that the oxygen partial pressure is less than $2 \times 10^{-9}$ mbar and the residual gas pressure does not exceed $2 \times 10^{-7}$ mbar; then
    c. charging said recipient with at least one laser gas under slight pressure, at the same time said aluminum or aluminum alloy coating is applied in a coating process that is controllable with regard to the layer growth rate, said coating covering a portion of said base to produce an electrically conductive connection between said coated basic element and said base; then
    d. bringing said coated basic element into a position over a gas inlet device in said recipient without interrupting said vacuum so that a laser gas mixture is admitted to the recipient up to a total pressure of a few mbar; and then
    e. repeatedly striking an electrical discharge to said coating contacted to the outside via the conductive base with an initiating electrode projecting into said recipient.

2. A process as defined in claim 1 further including the step of introducing a small amount of oxygen into said recipient in addition to said laser gas after a number of discharge surges.

3. A process as defined in claim 1 wherein said recipient is flooded with laser gas during coating up to a total pressure of $5 \times 10^{-4}$ mbar.

4. A process as defined in claim 1 wherein said coating layer is grown to a minimum layer thickness of 150 nm.

5. A process as defined in claim 1 further characterized in that said coating is controlled so that the deposition rate of layer growth is less than 1 nm/sec.

6. A process as defined in claim 4 wherein said deposition rate is recorded by means of a measuring process employing an oscillating crystal.

7. A process as defined in claim 1 further characterized in that a nozzle of electrically non-conductive material and interior concentrically located initiating electrode is employed as an inlet device for said laser gas mixture.

8. A process as defined in claim 7 wherein the surface of said initiating electrode is coated with precious metal.

* * * * *